United States Patent
Al-Hazmi et al.

(10) Patent No.: US 9,764,955 B2
(45) Date of Patent: Sep. 19, 2017

(54) METHOD FOR PRODUCING GRAPHENE WITH A CONTROLLABLE NUMBER OF LAYERS

(71) Applicant: King Abdulaziz University, Jeddah (SA)

(72) Inventors: Farag Saeed Marshoud Al-Hazmi, Jeddah (SA); Ahmed Abdullah Salem Al-Ghamdi, Jeddah (SA); Waleed Elsayed Mahmoud Elsayed, Jeddah (SA); Abdullah Yousif Abdullah Obaid, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 15/000,808

(22) Filed: Jan. 19, 2016

(65) Prior Publication Data

US 2017/0203968 A1    Jul. 20, 2017

(51) Int. Cl.
*C01B 31/04* (2006.01)

(52) U.S. Cl.
CPC ...... *C01B 31/0446* (2013.01); *C01B 2204/04* (2013.01)

(58) Field of Classification Search
CPC ............ C01B 31/0446; C01B 31/0469; C01B 2204/04
See application file for complete search history.

(56) References Cited

U.S. PATENT DOCUMENTS 8,747,623 B2    6/2014 Zhamu et al.

FOREIGN PATENT DOCUMENTS

| CN | 103991868 A |   | 8/2014 |
| CN | 104058396 A | * | 9/2014 |
| CN | 104556001 A |   | 4/2015 |

OTHER PUBLICATIONS

Al-Hazmi, F. S., et al. "One pot synthesis of graphene based on microwave assisted solvothermal technique." Synthetic Metals 200 (2015): 54-57.*
Liu, L., et al., "Few-Layer Graphene Prepared via Microwave Digestion Reduction and its Electrochemical Performances in Lithium Ion Batteries", URL: http://www.electrochemsci.org/papers/vol10/100201582.pdf, International Journal of Electrochemical Science, vol. 10, pp. 1582-1594, (2015).

* cited by examiner

*Primary Examiner* — Richard M Rump
(74) *Attorney, Agent, or Firm* — Oblon, McClelland, Maier & Neustadt, L.L.P.

(57) ABSTRACT

A method for producing pristine graphene of controllable thickness including monolayer, bilayer and multilayer graphene via microwave irradiation assisted intercalation of graphite with dicarboxylic acids of various molecular chain lengths and subsequent exfoliation is disclosed. The average thickness of the graphene and the number of layers in the graphene produced by the method can be controlled by the molecular chain length of the dicarboxylic acid used for intercalation.

16 Claims, 3 Drawing Sheets

METHOD FOR PRODUCING GRAPHENE WITH A CONTROLLABLE NUMBER OF LAYERS

BACKGROUND OF THE INVENTION

Technical Field

The present disclosure relates to an efficient and scalable method for producing graphene of controllable thickness and purity via intercalation of graphite with dicarboxylic acids of various molecular chain lengths and exfoliation.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Graphene is a two-dimensional crystalline material which is a monolayer of the material graphite with thickness of approximately 0.30-0.35 nm [Nobelprize.org. The 2010 Nobel Prize in Physics: Press Release; 19 Oct. 2010. http://nobel prize.org/nobelprizes/physics/laureates/2010/press.htm.—incorporated herein by reference in its entirety]. Thin graphite flakes consist of several layers of carbon atoms, including monolayer graphene. This graphene may consist of an isolated single layer of a hexagonal carbon network which is composed of $sp^2$-hybridized C—C bonding with $\pi$-electron clouds [Y Ohashi, T Koizumi, T Yoshikawa, et al. TANSO 1997; No. 180: 235-8.—incorporated herein by reference in its entirety]. The strong G bonds formed among the $sp^2$ hybrid orbitals in graphene result in an exceptionally high breaking strength and modulus of elasticity. Moreover, the $\pi$ and $\pi^*$ bonds formed through the hybridization of the $P_z$ atomic orbitals of the nearest carbon atoms cause an extraordinarily high conductivity [Y Ohashi, T Hironaka, T Kubo, et al. TANSO 2000; No. 195: 410-3—incorporated herein by reference in its entirety].

Due to the unique physical properties of graphene, including high stiffness, high carrier mobility, unusual magnetic properties and the room temperature quantum Hall effect, graphene has been employed in diverse technological applications such as biosensors, super capacitors and hydrogen storage materials. Therefore, it is important to develop rapid, easy and affordable methods to prepare high quality single layer graphene nanosheets free of defects.

Since the Nobel Prize in physics in 2010 was awarded to Professors A. Geim and K. Novoselov for their experiments on graphene, great efforts have been employed to prepare graphene [K S Novoselov, A K Geim, S V Morozov, et al. Science 2004; 306:666-9.—incorporated herein by reference in its entirety]. A variety of synthetic methods to prepare graphene have been developed which include mechanical cleavage of graphite, chemical vapor depositions (CVD) on different metal substrates, thermal decomposition of silicon carbide (SiC), chemical exfoliation of graphite and unzipping of carbon nanotubes via argon plasma etching.

The mechanical cleavage method was developed by A. Geim and K. Novoselov and involves introducing graphite powder to double-sided adhesive tapes and repeating the cleavage process several times until the graphite flakes become transparent with a thickness of approximately 15-110 nm. This method is not beneficial from a commercial or industrial standpoint. Additionally, the obtained thickness can be very large compared to the actual thickness of graphene (0.30-0.35 nm). The CVD techniques are based on the use of methane gas, hydrogen and argon in a thermal reactor at very high temperatures exceeding 1000° C. to form a graphene layer on a thin metal foil such as copper or nickel [Y Zhang, J P Small, W V Pontius, et al. Appl Phys Lett 2005; 86:073104; and J C Meyer, A K Geim, M I Katsnelson, et al. Nature 2007; 446:60-3.—each incorporated herein by reference in its entirety]. Although this method produces high quality graphene, it requires several tedious steps to transfer prepared graphene onto a silicon substrate to fabricate electronic devices. These steps include a spin coating of polymer on the metal foil that has graphene, followed by etching of the metal foil, transferring of the polymer coated graphene to a silicon/silicon dioxide (Si/$SiO_2$) substrate, and decomposing the polymer by ozone etching to remove the polymer. Such CVD methods are very harsh and expensive from an economical point of view. The same disadvantages have been observed for thermal decomposition of silicon carbide and the unzipping of carbon nanotubes by argon plasma etching [J C Meyer, A K Geim, M I Katsnelson, et al. Solid State Commun 2007; 143:101-9.—incorporated herein by reference in its entirety].

In chemical exfoliation methods or "Hummar methods", graphite is first treated with a mixture of sulfuric and nitric acids at low temperature followed by the addition of sodium nitrate and potassium permanganate and a gradual increase in the temperature up to 90° C. This method produces graphene oxide which consists of several layers rather than the desired monolayer. Furthermore, an additional step is required to reduce the graphene oxide to graphene [S Neubeck, Y M You, Z H Ni, et al. Appl Phys Lett 2010; 97:053110; and C H Lui, L Liu, K F Mak, et al. Nature 2009; 462:339-41.—each incorporated herein by reference in its entirety].

In view of the forgoing, one object of the present disclosure is to provide a simple, low cost, and efficient method to economically produce graphene on a mass production scale of a quality for industrial use. A further aim of the present disclosure, is to provide a method where the desired thickness and number of layers of graphene can be controlled during production, including monolayer graphene, bilayer graphene, and/or multilayer graphene by intercalating graphite with dicarboxylic acids of various molecular lengths and exfoliating to produce graphene.

BRIEF SUMMARY OF THE INVENTION

According to a first aspect, the present disclosure relates to a method for producing graphene nanosheets comprising i) treating graphite material with a liquid intercalating agent solution comprising at least one dicarboxylic acid for a first period of time to form a graphite intercalation compound, ii) heating the graphite intercalation compound by microwave irradiation for a second period of time to form an expanded graphite intercalation compound, iii) dispersing the expanded graphite intercalation compound into an alcohol to form a colloidal suspension of the expanded graphite intercalation compound, and iv) heating the colloidal suspension of the expanded graphite intercalation compound by microwave irradiation for a third period of time to exfoliate and/or reduce the expanded graphite intercalation compound and form graphene nanosheets.

In one embodiment, the dicarboxylic acid is a linear dicarboxylic acid and has the general formula HOOC—$(CH_2)_n$—COOH wherein n is a whole number in the range of 0-20.

In one embodiment, the dicarboxylic acid has a molecular chain length of 0.2-2.0 nm.

In one embodiment, the dicarboxylic acid is at least one selected from the group consisting of oxalic acid, succinic acid, adipic acid, suberic acid, and sebacic acid.

In one embodiment, the graphene nanosheets comprise 1-20 layers of graphene.

In one embodiment, the graphene nanosheets have an average thickness of less than 10 nm.

In one embodiment, the alcohol is hexanol.

In one embodiment, the first period of time is 1-36 hours.

In one embodiment, the second period of time is 5-300 seconds.

In one embodiment, the third period of time is 5-120 minutes.

In one embodiment, the method further comprises i) filtering the graphite intercalation compound after treating with the liquid intercalating agent solution, ii) washing the graphite intercalation compound, and iii) drying the graphite intercalation compound.

In one embodiment, the method further comprises i) precipitating the graphene nanosheets by rapid cooling after heating the colloidal suspension, ii) washing the graphene nanosheets with an acidic solution, and iii) drying the graphene nanosheets.

In one embodiment, the dicarboxylic acid is oxalic acid and the graphene nanosheets comprise monolayer graphene.

In one embodiment, the dicarboxylic acid is succinic acid and the graphene nanosheets comprise bilayer graphene.

In one embodiment, the dicarboxylic acid is adipic acid and the graphene nanosheets comprise 3-5 layers of graphene.

In one embodiment, the dicarboxylic acid is suberic acid and the graphene nanosheets comprise 6-8 layers of graphene.

In one embodiment, the dicarboxylic acid is sebacic acid and the graphene nanosheets comprise 9-15 layers of graphene.

In one embodiment, the liquid intercalating agent solution further comprises a mineral acid, an oxidizing agent or both.

In one embodiment, the graphene nanosheets are pristine graphene with a carbon content of greater than 95% by weight relative to the total weight of the graphene nanosheet.

In one embodiment, the graphene nanosheets are pristine graphene with an oxidized graphene content of less than 5% by weight relative to the total weight of the graphene nanosheet.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figures 1, 2:
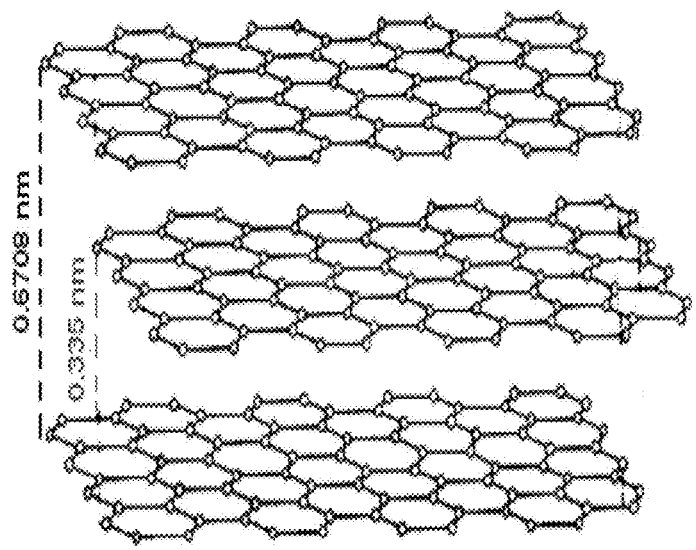
FIG. 1 is a table of representative dicarboxylic acids used in the liquid intercalating agent solution.
FIG. 2 is a schematic diagram of the crystal structure of graphite.

Referring now to the drawings, wherein, like reference numerals designate identical or corresponding parts throughout the several views.

According to a first aspect, the present disclosure relates to a method for producing graphene nanosheets, comprising i) treating graphite material with a liquid intercalating agent solution comprising at least one dicarboxylic acid for a first period of time to form a graphite intercalation compound, ii) heating the graphite intercalation compound by microwave irradiation for a second period of time to form an expanded graphite intercalation compound, iii) dispersing the expanded graphite intercalation compound into an alcohol to form a colloidal suspension of the expanded graphite intercalation compound, and iv) heating the colloidal suspension of the expanded graphite intercalation compound by microwave irradiation for a third period of time to exfoliate and/or reduce the expanded graphite intercalation compound and form graphene nanosheets.

As used herein, "graphene" is an allotrope of carbon in the form of a two-dimensional, atomic-scale hexagonal lattice in which one atom forms each vertex. Graphene is approximately 200 time stronger than steel by weight and conducts heat and electricity with great efficiency. Structurally, graphene is a crystalline allotrope of carbon with 2-dimensional properties. As used herein, graphene is a sheet of six membered carbon rings that do not form a closed surface. Its carbon atoms are densely packed in a regular atomic-scale "chicken wire" hexagonal pattern. Each atom has four bonds, one σ-bond with each of its three neighbors and one π-bond that is oriented out of the plane. Graphene's hexagonal lattice can be regarded as two interleaving triangular lattices.

Graphene's stability is due to its tightly packed carbon atoms and each carbon atom in a graphene sheet having a $sp^2$ orbital hybridization and delocalized electrons present at opposite surfaces of the graphene sheet. The $sp^2$ hybridization is a combination of orbitals S, $P_x$ and $P_y$ that constitute the σ-bond, the final $P_z$ electron makes up the π-bond. The π-bonds hybridize together to form the π-band and the π*-band. These bands are responsible for most of graphene's notable electronic properties, via the half-filled band that permits free-moving electrons. Graphene is a zero-gap semiconductor. Graphene is also the only form of carbon (or solid material) in which every atom is available for chemical reaction from two sides (due to the 2D structure. Graphene is the basic structural element of other carbon allotropes including graphite, charcoal, carbon nanotubes and fullerenes. For example, carbon nanotubes are formed by rolling up a graphene sheet or graphene sheets into a tubular structure and graphite is formed by stacking multiple-graphene sheets.

In very basic terms graphene can be described as a single, one atom to tens of atoms thick layer of the commonly found mineral graphite. Graphite is essentially made up of hundreds, preferably thousands or tens to hundreds of thousands of layers of graphene. As used herein, "graphite" is a crystalline form of carbon, a semimetal, a native element mineral and one of the allotropes of carbon. Graphite is the most stable form of carbon under standard conditions and is used in thermochemistry as the standard state for defining the heat of formation of carbon compounds. Graphite has a layered, planar structure. In each layer, the carbon atoms are arranged in a honeycomb lattice with separation of 0.14-0.15 nm, preferably 0.14-0.145 nm or 0.142 nm and a distance between planes of 0.3-0.35 nm, preferably 0.32-0.345 nm, preferably 0.33-0.34 nm, or 0.335 nm. Atoms in the plane are bonded covalently, with only three of the four potential bonding sites satisfied. The fourth electron is free to migrate in the plane, making graphite electrically conductive; however, it does not conduct in a direction at right angles to the plane. Bonding between layers is via weak van der Waals bonds, which allows layers of graphite to be easily separated, or to slide past each other. In one embodiment, the graphite material employed in the method described herein comprises 10-500000 layers of graphene, preferably 100-400000 layers of graphene, preferably 500-300000 layers of graphene, preferably 1000-250000 layers of graphene, preferably 5000-200000 layers of graphene, preferably 10000-150000 layers of graphene, preferably 25000-125000 layers of graphene, preferably 50000-100000 layers of graphene.

The two known forms of graphite are alpha (α, hexagonal) and beta (β, rhombohedral). The two forms have very similar physical properties, except the graphene layers stack slightly differently. The hexagonal graphite may be either flat or buckled. The alpha form can be converted to the beta form through mechanical treatment and the beta form reverts to the alpha form when heated to sufficiently high temperatures (~1300° C.). In terms of the present disclosure, the graphite material employed in the method described herein may be alpha, beta, or mixtures thereof.

There are three principal types of natural graphite, each occurring in different types of ore deposit. Crystalline flake graphite (or flake graphite) occurs as isolated, flat, plate-like particles with hexagonal edges if unbroken and when broken the edges can be irregular or angular. Amorphous graphite refers to very fine flake graphite. Lump graphite (or vein graphite) occurs in fissure veins or fractures and appears as massive platy intergrowths of fibrous or acicular crystalline aggregates. Highly ordered pyrolytic graphite (or more correctly highly oriented pyrolytic graphite (HOPG)) refers to graphite with an angular spread between the graphite sheets of less than 1°. Graphite fiber is also sometimes used to refer to carbon fiber and/or carbon fiber reinforced polymer. In terms of the present disclosure, the graphite material employed in the method described herein may be natural graphite, synthetic graphite, crystalline flake graphite, highly oriented pyrolytic graphite, graphite fiber, graphitic nanofiber, graphite fluoride, chemically modified graphite, exfoliated graphite or mixtures thereof, preferably crystalline flake graphite or highly oriented pyrolytic graphite, most preferably crystalline flake graphite.

In one step, graphite material is treated with a liquid intercalating agent solution comprising at least one dicarboxylic acid for a first period of time to form a graphite intercalation compound. In a preferred embodiment, the first period of time is 1-36 hours, preferably 4-32 hours, preferably 8-30 hours, preferably 12-28 hours, preferably 16-27 hours, preferably 18-26 hours, preferably 22-25 hours or 24 hours and the treatment is performed at a temperature of 0-100° C., preferably 5-80° C., preferably 10-60° C., preferably 15-50° C., preferably 20-40° C. or ambient room temperature of approximately 25° C. In a preferred embodiment, the liquid intercalating agent solution comprises at least one dicarboxylic acid at a concentration in the range of 0.1-10.0 M, preferably 0.25-5.0 M, preferably 0.5-4.0 M, more preferably 0.75-3.0 M, more preferably 1.0-2.5 M or 2.0 M. In one embodiment, the liquid intercalating agent solution is a polar protic solution, more preferably an aqueous solution. It is equally envisaged that the liquid intercalating agent solution may be adapted to comprise additional polar protic solvents (i.e. n-butanol, isopropanol, n-propanol, ethanol, methanol, formic acid, acetic acid), polar aprotic solvents (i.e. tetrahydrofuran, ethyl acetate, acetone, dimethyl formamide, acetonitrile, dimethyl sulfoxide, nitromethane, propylene carbonate), non-polar solvents (i.e. pentane, cyclopentane, hexane, cyclohexane, benzene, toluene, 1,4-dioxane, chloroform, diethyl ether, dichloromethane) and mixtures thereof.

As used herein, "intercalation" is the reversible inclusion or insertion of a molecule (or ion) into compounds with layered structures. Many layered solids intercalate guest molecules, such as graphite. Intercalation expands the van der Waals gap between sheets, which requires energy; usually this energy is supplied by charge transfer between the guest and the host solid (i.e. redox). Often, treating graphite with strong acid in the presence of oxidizing agents, causes graphite oxidize and be intercalated. Exemplary intercalation is found in graphite intercalation compounds.

As used herein, "graphite intercalation compounds" (GICs) are complex materials having a formula of $CX_m$, wherein the ion $X^{y+}$ or $X^{y-}$ is inserted (i.e. intercalated) between the oppositely charged carbon layers. Typically m is much less than 1. In a preferred embodiment, the graphene intercalation compound of the present disclosure has a formula of $C(HO_2C-R-CO_2^-)_m$ or $C(^-O_2C-R-CO_2^-)_m$, more preferably $C(HOOC-(CH_2)_n-COO^-)_m$ or $C(^-OOC-(CH_2)_n-COO^-)_m$, wherein m is less than 1, preferably less than 0.75, preferably less than 0.5, preferably less than 0.25, preferably less than 0.1, preferably less than 0.01, preferably less than 0.001, preferably less than 0.0001 and wherein n is a whole number in the range of 0-20, preferably in the range of 0-18, preferably 0-16, preferably 0-14, more preferably 0-12, more preferably 0-10, most preferably 0-8. These materials may be deeply colored solids that exhibit a range of the electrical and redox properties of potential applications.

Graphene intercalation compounds (GICs) are generally prepared by treating graphite with a strong oxidant or a strong reducing agent. The reaction is reversible. In a graphite intercalation compound not every layer is necessarily occupied by guests. In stage 1 compounds, graphite layers and intercalated layers alternate and in stage 2 compounds two graphite layers with no guest material in between alternate with an intercalated layer. The actual composition may vary and therefore these compounds are an example of non-stoichiometric compounds. Generally, the composition and stage are specified, in terms of the present disclosure, the graphene intercalation compound may be stage 1-100, preferably stage 1-75, preferably stage 1-50, preferably stage 1-25, preferably stage 1-20, preferably stage 1-10, preferably stage 1-5, preferably stage 1-2. Exemplary graphene intercalation compounds may include, but are not limited to, alkali and alkaline earth derivatives, metal halide derivatives, halogen- and oxide-graphite compounds, oxidized carbons (i.e. graphite bisulfate, perchlorate, hexfluoroarsenate) and mixtures thereof.

As used herein, a "dicarboxylic acid" refers to an organic compound containing two carboxyl functional groups (—COOH). The general molecular formula for dicarboxylic acids can be written as $HO_2C$—R—$CO_2H$, where R can be aliphatic or aromatic. Dicarboxylic acids are crystalline solids. Dicarboxylic acids where the carboxylic groups are separated by none or one carbon atom may decompose when they are heated to give off carbon dioxide and leave behind a monocarboxylic acid. In general, dicarboxylic acids show similar chemical behavior and reactivity to monocarboxylic acids and the dicarboxylic acids have several industrial uses.

In a preferred embodiment, the dicarboxylic acid is a linear dicarboxylic acid having the general formula HOOC—$(CH_2)_n$—COOH, wherein n is a whole number in the range of 0-20, preferably in the range of 0-18, preferably 0-16, preferably 0-14, more preferably 0-12, more preferably 0-10, most preferably 0-8. Many linear dicarboxylic acids with the formula HOOC—$(CH_2)_n$—COOH are found in nature. They are also known as α,ω-dicarboxylic acids, meaning that the two carboxylate groups are at the two ends of the aliphatic chain of methylene groups. Long-chain members may be classified as lipids. Solubility in water and melting point of the α,ω-dicarboxylic acids progress in a series as the carbon chains become longer with alternating between odd and even numbers of carbon atoms, so that for even numbers of carbon atoms the melting point is higher than for the next in the series with an odd number. These compounds are weak dibasic acids with $pK_a$ tending towards the values of 4-6, preferably 4.5-5.5 as the separation between the two carboxylate groups increases. Thus, in aqueous solution at pH of about 7, the Henderson-Hasselbalch equation indicates they exist predominantly as dicarboxylate anions.

In a preferred embodiment, the dicarboxylic acid is a linear dicarboxylic acid and the linear dicarboxylic acid is at least one selected from the group consisting of oxalic acid (ethanedioic acid, HOOC—$(CH_2)_n$—COOH wherein n=0 or HOOC—COOH), succinic acid (butanedioic acid, HOOC—$(CH_2)_2$—COOH), adipic acid (hexanedioic acid, HOOC—$(CH_2)_4$—COOH), suberic acid (octanedioic acid, HOOC—$(CH_2)_6$—COOH) and sebacic acid (decanedioic acid, HOOC—$(CH_2)_8$—COOH). It is equally envisaged that the method may be adapted to include additional linear dicarboxylic acids including, but not limited to, malonic acid (propanedioic acid, HOOC—$(CH_2)_1$—COOH), glutaric acid (pentanedioic acid, HOOC—$(CH_2)_3$—COOH), pimelic acid (heptanedioic acid, HOOC—$(CH_2)_5$—COOH), azelaic acid (nonanedioic acid, HOOC—$(CH_2)_7$—COOH), brassilic acid (undecanedioic acid, HOOC—$(CH_2)_9$—COOH), dodecanedioic acid (HOOC—$(CH_2)_{10}$—COOH), thapsic acid (hexadecanedioic acid, HOOC—$(CH_2)_{14}$—COOH) or mixtures thereof.

In a preferred embodiment, the dicarboxylic acid of the present disclosure has a molecular chain length of 0.2-2.0 nm, preferably 0.23-1.9 nm, preferably 0.26-1.8 nm, preferably 0.29-1.7 nm, preferably 0.3-1.6 nm, preferably 0.33-1.5 nm. As used herein, the "molecular chain length" refers to the distance between dicarboxylic acid (—COOH) moieties in the dicarboxylic acid described herein. In one embodiment, the molecular chain length is measured from the carbonyl carbon (C=O) of each carboxylic acid moiety. It is equally envisaged that the molecular chain length may be measured from the hydroxyl oxygen (—OH) of each carboxylic acid moiety, the σ-carbon of each carboxylic acid moiety and/or mixtures thereof and still provide suitable dicarboxylic acids for use in the present disclosure. In one embodiment ChemOffice MOPAC 2002 software can be used to measure molecular length.

In one embodiment, the dicarboxylic acid is a linear dicarboxylic acid that comprises an unsubstituted alkyl ($CH_2$) chain. It is equally envisaged that the present disclosure may be adapted to incorporate optionally substituted dicarboxylic acids. Exemplary acceptable substituted dicarboxylic acids include, but are not limited to, aspartic acid (2-aminobutanedioic acid), glutamic acid (2-aminopentanedioic acid), diaminopimelic acid ((2R,6S)-2,6-diaminoheptanedioic acid, tartronic acid (2-hydroxypropanedioic acid), tartaric acid (2,3-dihydroxybutanedioic acid), arabinaric acid (2,3,4-trihydroxypentanedioic acid), saccharic acid ((2S,3 S,4S,5R)-2,3,4,5-tetrahydroxyhexanedioic acid), mesoxalic acid (oxopropanedioic acid), oxaloacetic acid (oxobutanedioic acid), acetonedicarboxylic acid (3-oxopentanedioic acid) and mixtures thereof.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl, or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g. —$SO_2NH_2$), substituted sulfonamide, nitro, cyano, carboxy, carbamyl (e.g. —$CONH_2$), substituted carbamyl (e.g. —CONHalkyl, —CONHaryl, —CONHarylalkyl or cases where there are two substituents on one nitrogen from alkyl, aryl or arylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, hompiperazinyl and the like), substituted heterocyclyl and mixtures thereof and the like.

In another embodiment, it is equally envisaged that the present disclosure may be adapted to incorporate unsaturated dicarboxylic acids. Exemplary acceptable unsaturated dicarboxylic acids include, but are not limited to, monounsaturated dicarboxylic acids such as maleic acid ((Z)-butenedioic acid), fumaric acid ((E)-butenedioic acid, glutaconic acid (pent-2-enedioic acid, cis or trans isomers), traumatic acid (dodec-2-enedioic acid); diunsaturated dicarboxylic acids such as muconic acid ((2E,4E)-hexa-2,4-dienedioic acid, trans/trans, cis/trans and cis/cis isomers), glutinic acid (allene-1,3-dicarboxylic acid, (RS)-2,3-pentadienedioic acid); branched unsaturated dicarboxylic acids such as citraconic acid ((2Z)-2-methylbut-2-enedioic acid), mesaconic acid ((2E)-2-methyl-2-butenedioic acid and mixtures thereof.

In another embodiment, it is equally envisaged that the present disclosure may be adapted to incorporate aromatic dicarboxylic acids. Exemplary acceptable aromatic dicarboxylic acids include, but are not limited to, phthalic acid (o-phthalic acid, benzene-1,2-dicarboxylic acid), isophthalic acid (m-phthalic acid, benzene-1,3-dicarboxylic acid), terephthalic acid (p-phthalic acid, benzene-1,4-dicarboxylic acid), diphenic acid (biphenyl-2,2'-dicarboxylic acid, 2-(2-carboxyphenyl)benzoic acid) and mixtures thereof.

In another embodiment, it is equally envisaged that the present disclosure may be adapted to incorporate alkylitaconate dicarboxylic acids. Several dicarboxylic acids having an alkyl side chain and an itaconate core have been isolated, such as itaconic acid (methylenesuccinic acid). Among these compounds, several analogs, called chaetomellic acids with different chain lengths and degrees of unsaturation have been isolated. A series of alkyl- and alkenyl-itaconates, known as ceriporic acids having absolute configuration and stereoselectivity have been identified.

In another embodiment, it is equally envisaged that the present disclosure may be adapted to incorporate branched-chain dicarboxylic acids. Long-chain dicarboxylic acids containing vicinal dimethyl branching near the center of the carbon chain are known. These acids, often termed diabolic acids have varying chain lengths. Exemplary branched-chain dicarboxylic acids include, but are not limited to, C30 to C34 diabolic acids, C30 diabolic acid (13,14-dimethyl-octacosanedioic acid, C32 diabolic acid (15,16-dimethyl-triacontanedioic acid), C29 and C32 diacids with methyl groups on the carbons C-13 and C-16, C30 diacid ($\alpha,\omega$-13, 16-dimethyloctacosanedioic acid), biphytanic diacids (several forms without or with one or two pentacyclic rings), crocetin and mixtures thereof. Crocetin refers to the core compound of the crocins (crocetin glycosides). Crocetin is a 20-carbon chain dicarboxylic acid which is a diterpenenoid and can be classified as a carotenoid. For example, crocin 2 contains a disaccharide group at each end of the molecule, and at least three other derivatives are known with different glycosylations.

In another embodiment, it is equally envisaged that the present disclosure may be adapted to incorporate dicarboxylic acid variants and isosteres. As used herein, "isosteres" refers to molecules or ions with the same number of atoms, the same number of valence electrons, and/or similarly reactive electron shells. Exemplary dicarboxylic acid variants and isosteres may include, but are not limited to, mono- or di-moieties of hydroxamic acids, phosphonic acids, phosphinic acids, sulphonic acids, sulfonamides, acylsulfonamides, sulfonylureas, tetrazoles, thizaolidinediones, oxazolidinediones, 5-oxo-1,2,4-oxadiazoles, 5-oxo-1,2,4-thiadiazoles, 5-thioxo-1,2,4-oxadiazoles, isothiazoles, isoxazoles, difluorophenols, squaric acids, tetramic acids, tetronic acids, cyclopentane-1,3-diones, 4-hyrdoxyquinolin-2-ones, 3-hydroxyquinolin-2-ones and mixtures thereof.

It is equally envisaged that the present disclosure may be adapted to incorporate tricarboxylic acids, organic carboxylic acids whose chemical structures contain three carboxyl functional groups (—COOH). Exemplary tricarboxylic acids include, but are not limited to, citric acid (2-hydroxypropane-1,2,3-tricarboxylic acid), isocitric acid (1-hydroxypropane-1,2,3-tricarboxylic acid), aconitic acid (prop-1-ene-1,2,3-tricarboxylic acid), propane-1,2,3-tricarboxylic acid, trimesic acid (benzene-1,3,5-tricarboxylic acid) and mixtures thereof.

In one embodiment, the liquid intercalating agent solution may further comprise a mineral acid, an oxidizing agent or both. Exemplary mineral acids (inorganic acids) include, but are not limited to, hydrogen halides and their solutions (hydrofluoric acid, hydrochloric acid, hydrobromic acid, hydroiodic acid), halogen oxoacids (hypochlorous acid, chlorous acid, chloric acid, perchloric acid and corresponding bromine and iodine compounds), sulfuric acid, nitric acid, phosphoric acid, boric acid and the like. Exemplary oxidizing agents include, but are not limited to, hydrogen peroxide, halogens (i.e. fluorine and chlorine), nitric acid and nitrate compounds, sulfuric acid, peroxydisulfuric acid, peroxymonosulfuric acid, chlorite, chlorate, perchlorate (and analogous halogen compounds), hypochlorite (and other hypohalite compounds), permanganate compounds (i.e. potassium permanganate), sodium perborate, nitrous oxide, ozone, oxygen, potassium nitrate, hexavalent chromium compounds (i.e. chromic and dichromic acids, chromium trioxide, pyridinium chlorochromate, and chromate/dichromate compounds). In one embodiment, the liquid intercalating agent solution may further comprise a carboxylic acid including, but not limited to, an aromatic carboxylic acid, an aliphatic carboxylic acid, a cycloaliphatic carboxylic acid, a straight chain or branched chain carboxylic acid, a saturated or unsaturated monocarboxylic acid, a polycarboxylic acid, anhydrides thereof, reactive carboxylic acid derivatives thereof and alkyl esters thereof. Exemplary carboxylic acids include, but are not limited to, formic acid, acetic acid, propionic acid, butyric acid, pentanoic acid, hexanoic acid and the like.

In one embodiment, the method may further comprise isolation of the graphite intercalation compound which comprises i) filtering the graphite intercalation compound after treating with the liquid intercalating agent, ii) washing the graphite intercalation compound several times, preferably 1-10 times, preferably 2-8 times, preferably 3-6 times, preferably with an aqueous solution until any excess of dicarboxylic acid has been removed, and iii) drying the graphite intercalation compound preferably at a temperature of 20-60° C., preferably 20-50° C., preferably 20-40° C. or ambient room temperature of approximately 25° C. naturally and in open air.

In one step, the graphite intercalation compound is heated by microwave irradiation for a second period of time to form an expanded graphite intercalation compound. Microwave irradiation refers to the science of applying microwave radiation to chemical reactions. Microwaves act as high frequency electric fields and will generally heat any material containing mobile electric charges, such as polar molecules in a solvent or conducting ions in a solid. In a preferred embodiment, the graphite intercalation compound is heated in a microwave reactor under microwave irradiation at a temperature above 175° C., preferably above 200° C., preferably above 225° C., preferably above 250° C., preferably above 275° C., preferably above 300° C. at 200-1000 W, preferably 300-975 W, preferably 400-950 W, preferably 500-925 W, preferably 600-900 W, preferably 700-875 W or 850 W at a frequency of 1-20 GHz, preferably 2-10 GHz, preferably 2-5 GHz. In a preferred embodiment, the second period of time is 5-300 seconds, preferably 10-250 seconds, preferably 15-200 seconds, preferably 20-150 seconds, more preferably 30-120 seconds, more preferably 45-90 seconds, or 60 seconds. In one embodiment, the heating by microwave irradiation is performed neat without solvent. It is equally envisaged that heating by microwave irradiation may be adapted to be performed in non-polar solvents, polar aprotic solvents, polar protic solvents and mixtures thereof.

In one embodiment, the expanded graphite intercalation compound formed by heating by microwave irradiation may have an average thickness of 100-500% that of the graphite intercalation compound, preferably 110-400%, preferably 120-300%, preferably 130-250%, preferably 140-200%, preferably 150-200%.

In one step, the expanded graphite intercalation compound is dispersed into an alcohol to form a colloidal suspension of the expanded graphite intercalation compound. As used herein, a "colloid" is a substance in which microscopically dispersed insoluble particles are suspended throughout another substance. Often the dispersed substance alone is called the colloid. The term "colloidal suspension" refers unambiguously to the overall mixture. Unlike a solution, a colloid has a dispersed phase (the suspended particles) and a continuous phase (the medium of suspension). To qualify as a colloid, the mixture must be one that does not settle, and/or takes an appreciably long time to settle. A sol is a term used to refer to a colloidal suspension of very small solid particles in a continuous liquid medium. Suitable short chain alcohols may include, but are not limited to, one or more of methanol, ethanol, propanol, isopropanol, butanol, or the like. In a preferred embodiment, the alcohol is hexanol which provides surface energy matching that of graphene, a high diffusion coefficient, low interfacial tension and excellent surface wetting. Properties such as these enable the hexanol to efficiently exfoliate graphite directly to graphene. It is equally envisaged that dispersion may be adapted to be performed in other polar protic solvents (i.e. water) as well as non-polar solvents, polar aprotic solvents, and mixtures thereof. In a preferred embodiment, the colloidal suspension has a solids content of 0.1 to 0.001 g/mL, preferably 0.05-0.005 g/mL, more preferably 0.025-0.0075 g/mL, or 0.01 g/mL.

In one step, the colloidal suspension of the expanded graphite intercalation compound is heated by microwave irradiation for a third period of time to exfoliate and/or reduce the expanded graphite intercalation compound and form graphene nanosheets. As used herein, "exfoliation" refers to the extreme of expansion and/or intercalation, as in the complete separation of the layers of the material (i.e. graphite into graphene). In a preferred embodiment, the colloidal suspension of the expanded graphite intercalation compound is heated in a microwave reactor under microwave irradiation at a temperature above 175° C., preferably above 200° C., preferably above 225° C., preferably above 250° C., preferably above 275° C., preferably above 300° C. at 200-1000 W, preferably 300-975 W, preferably 400-950 W, preferably 500-925 W, preferably 600-900 W, preferably 700-875 W or 850 W at a frequency of 1-20 GHz, preferably 2-10 GHz, preferably 2-5 GHz. In a preferred embodiment, the third period of time is 5-120 minutes, preferably, 10-100 minutes, preferably 15-80 minutes, preferably 20-60 minutes, preferably 25-40 minutes or 30 minutes.

In one embodiment, the method may further comprise isolation and purification of the graphene nanosheets which comprises i) precipitating the graphene nanosheets by rapid cooling after heating the colloidal suspension, preferably by quenching into an ice bath having a temperature of −15-30° C., preferably −10-20° C., preferably −5-10° C. or 0-5° C. with a cooling rate of at least 5° C./min, preferably at least 10° C./min, preferably at least 15° C./min, preferably at least 20° C./min, preferably at least 25° C./min, preferably at least 50° C./min, preferably at least 100° C./min and removing supernatant after centrifugation at 1000-25000 rpm, preferably 5000-20000 rpm, preferably 7500-15000 rpm, or 10000 rpm for 1-60 minutes, preferably 5-45 minutes, preferably 10-30 minutes or 15 minutes, ii) washing graphene nanosheets several times, preferably 1-10 times, preferably 2-8 times, preferably 3-6 times, preferably with an acidic aqueous solution with a pH of 1-7, preferably 2-6, preferably 3-5, and iii) drying the graphene nanosheets at a temperature of 25-75° C., preferably 30-70° C., preferably 40-60° C. or 50° C. overnight.

As used herein, "graphene nanosheets" refers to solid graphene material having one, two or three dimensions of less than 100 nm. In a preferred embodiment, the graphene nanosheets have at least one dimension of less than 100 nm, generally thickness. The graphene nanosheets are small objects that behave as a whole unit with respect to its transport and properties. They are nanoparticles named for the real-world shapes that they appear to represent. These morphologies sometimes arise spontaneously as an effect of the synthesis or from the innate crystallographic growth patterns of the materials themselves. In one embodiment, the graphene produced by the method described herein may be synthesized and formed into a variety of morphologies and forms including, but not limited to, nanosheets, nanoplatelets, nanoparticles, nanocrystals, nanospheres, nanowires, nanofibers, nanoribbons, nanorods, nanotubes, nanocylinders, nanogranules, nanowhiskers, nanoflakes, nanofoils, nanopowders, nanoboxes, nanostars, tetrapods, nanobelts, nanoflowers, etc. and mixtures thereof. Graphene nanosheets have a "sheet" or "platelet" morphology, meaning they have a very thin but wide aspect ratio. They may consist of a single or multiple sheets of graphene with an overall thickness. In one embodiment, the graphen nanosheets overlap one another to form a multilayer structure.

In one embodiment, the graphene nanosheets produced by the method described herein in any of its embodiments may be monolayer, bilayer or multilayer. As used herein, "multilayer graphene" refers to a material consisting of two or more layers of graphene. Multilayer graphene can exist in the AB, or Bernal-stacked form, where half of the atoms lie directly over the center of a hexagon in the lower graphene sheet, and half of the atoms lie over an atom. Multilayer graphene can also exist in the AA form in which the layers are exactly aligned. Multilayer graphene can also be found in a twisted configuration. In terms of the present disclosure, the graphene nanosheets produced by the method described herein in any of its embodiments may be multilayer graphene in the AB form, the AA form, the twisted form or mixtures thereof.

In a preferred embodiment, the graphene nanosheets produced by the method described herein in any of its embodiments comprise 1-20 layers of graphene, preferably 1-18 layers of graphene, preferably 1-16 layers of graphene, preferably 1-15 layers of graphene, preferably 1-14 layers of graphene, preferably 1-13 layers of graphene, most preferably 1-12 layers of graphene. In a preferred embodiment, the graphene nanosheets produced by the method described herein in any of its embodiments have an average thickness of less than 10 nm, preferably 0.1-10 nm, preferably 0.15-8 nm, preferably 0.2-6 nm, preferably 0.25-5 nm, more preferably 0.3-4 nm, more preferably 0.33-4 nm.

In one embodiment, the graphene nanosheets produced by the method described herein in any of its embodiments have an average diameter or longest dimension width of 1-200 μM, preferably 1-100 μm, preferably 1-75 μm, preferably 2.5-50 μm, preferably 5-45 nm, preferably 10-40 μm. In one embodiment, the graphene nanosheets produced by the method described herein in any of its embodiments have an aspect ratio of 100-5000, preferably 250-2500, preferably 500-2000, preferably 750-1500, more preferably 900-1250.

In one embodiment, the graphene nanosheets produced by the method described herein in any of its embodiments have a surface area in the range of 10-2500 $nm^2$, preferably 25-2000 $nm^2$, more preferably 50-1500 $nm^2$, more preferably 75-1250 $nm^2$, more preferably 100-1000 $nm^2$, more preferably 150-750 $nm^2$, or more preferably 200-500 $nm^2$. In one embodiment, the graphene nanosheets produced by the method described herein in any of its embodiments have a specific surface area of 2.5-750 $m^2/g$, preferably 5-500 $m^2/g$, preferably 7.5-300 $m^2/g$, preferably 10-150 $m^2/g$, preferably 12-120 $m^2/g$, preferably 15-100 $m^2/g$.

In a preferred embodiment, the average thickness of the graphene nanosheets and the number of layers in the graphene nanosheets produced by the method described herein in any of its embodiments may be controlled by the molecular chain length of the dicarboxylic acid used. In one embodiment, as the molecular chain length of the dicarboxylic acid comprising the liquid intercalating agent solution decreases the average thickness of the graphene nanosheets and the number of layers of graphene in the graphene nanosheets decreases. In one embodiment, as the molecular chain length of the dicarboxylic acid comprising the liquid intercalating agent solution increases the average thickness of the graphene nanosheets and the number of layers of graphene in the graphene nanosheets increases.

In a preferred embodiment, the dicarboxylic acid is oxalic acid (ethanedioic acid, HOOC—$(CH_2)_n$—COOH wherein n=0 or HOOC—COOH) having a chain length of 0.3-0.5 nm, preferably 0.35-0.45 nm, preferably 0.36-0.40 nm or 0.38 nm and the graphene nanosheets produced by the method described herein in any of its embodiments comprise monolayer graphene and have an average thickness of less than 0.4 nm, preferably less than 0.375 nm, preferably less than 0.35 nm, preferably less than 0.34 nm, preferably less than 0.3375 nm. In a preferred embodiment, the dicarboxylic acid is oxalic acid and the method described herein produces graphene nanosheets comprising at least 80% monolayer graphene nanosheets, preferably at least 85%, preferably at least 90%, preferably at least 95%, preferably at least 96%, preferably at least 97%, preferably at least 98%, preferably at least 99% monolayer graphene nanosheets.

In a preferred embodiment, the dicarboxylic acid is succinic acid (butanedioic acid, HOOC—$(CH_2)_2$—COOH) having a chain length of 0.5-0.8 nm, preferably 0.55-0.75 nm, preferably 0.60-0.70 nm, preferably 0.65-0.70 nm or 0.68 nm and the graphene nanosheets produced by the method described herein in any of its embodiments comprise bilayer graphene and have an average thickness of 0.4-0.8 nm, preferably 0.5-0.75 nm, preferably 0.6-0.7 nm, preferably 0.64-0.69 nm, preferably 0.66-0.68 nm or 0.67 nm. In a preferred embodiment, the dicarboxylic acid is succinic acid and the method described herein produces graphene nanosheets comprising at least 80% bilayer graphene nanosheets, preferably at least 85%, preferably at least 90%, preferably at least 95%, preferably at least 96%, preferably at least 97%, preferably at least 98%, preferably at least 99% bilayer graphene nanosheets.

In a preferred embodiment, the dicarboxylic acid is adipic acid (hexanedioic acid, HOOC—$(CH_2)_4$—COOH) having a chain length of 0.8-1.1 nm, preferably 0.85-1.05 nm, preferably 0.90-1.0 nm, preferably 0.95-1.0 nm or 0.96 nm and the graphene nanosheets produced by the method described herein in any of its embodiments comprise 3-5 layers of graphene, preferably 4 layers of graphene and have an average thickness of 1-1.65 nm, preferably 1.1-1.6 nm, preferably 1.2-1.5 nm, preferably 1.25-1.45 nm, preferably 1.3-14 nm preferably 1.325-1.375 nm or 1.35 nm.

In a preferred embodiment, the dicarboxylic acid is suberic acid (octanedioic acid, HOOC—$(CH_2)_6$—COOH) having a chain length of 1.1-1.3 nm, preferably 1.15-1.25 nm, preferably 1.18-1.22 nm or 1.20 nm and the graphene nanosheets produced by the method described herein in any of its embodiments comprise 6-8 layers of graphene, preferably 7 layers of graphene and have an average thickness of 2-2.7 nm, preferably 2.1-2.6 nm, preferably 2.2-2.5 nm, preferably 2.3-2.4 nm, or 2.35 nm.

In a preferred embodiment, the dicarboxylic acid is sebacic acid (decanedioic acid, HOOC—$(CH_2)_8$—COOH) having a chain length of 1.3-2.0 nm, preferably 1.32-1.9 nm, preferably 1.34-1.8 nm, preferably 1.36-1.6 nm, preferably 1.38-1.5 nm, preferably 1.40-1.45 nm or 1.42 nm and the graphene nanosheets produced by the method described herein in any of its embodiments comprise 9-15 layers of graphene, preferably 10-14 layers of graphene, preferably 11-13 layers of graphene, preferably 12 layers of graphene and have an average thickness of 3-5 nm, 3.25-4.75 nm, preferably 3.5-4.5 nm, preferably 3.25-4.25 nm, or 4 nm.

In one embodiment, the graphene nanosheets produced by the method described herein in any of its embodiments is pristine graphene. As used herein, "pristine graphene" refers to pure carbonaceous material having a purity of greater than 90%, preferably greater than 95%, preferably greater than 96%, preferably greater than 97%, preferably greater than 98%, preferably 99%. In a preferred embodiment, the graphene nanosheets produced by the method described herein in any of its embodiments are pristine graphene with a carbon content of greater than 95% by weight relative to the total weight of the graphene nanosheet, preferably greater than 96%, preferably greater than 97%, preferably greater than 98%, preferably greater than 99% by weight relative to the total weight of the graphene nanosheet. In a preferred embodiment, the graphene nanosheets produced by the method described herein in any of its embodiments are pristine graphene with an oxidized graphene content of less than 5%, preferably less than 4%, preferably less than 3%, preferably less than 25, preferably less than 1%. In one embodiment, the graphene nanosheets produced by the method described herein in any of its embodiments have a C:O ratio of at least 10, preferably at least 20, preferably at least 30, preferably at least 40, preferably at least 50, preferably at least 75, preferably at least 100, preferably at least 150, preferably at least 200, preferably at least 250, preferably at least 500.

In one embodiment, it is equally envisaged that the method described herein in any of its embodiments may be adapted to produce chemically modified graphene; graphene is commonly modified with nitrogen and oxygen containing functional groups (i.e. graphene oxide). Exposed carbon on the edges of nanosheets or nanoplatelets often reacts with the atmosphere to form hydroxyls, carboxyls, lactones, pyrenes, alcohols, carbonyls, imines and/or amines. These modifications may be covalent, non-covalent or mixtures thereof. Exemplary functional groups on graphene include, but are not limited, to alcoholic, carboxylic, aldehydic, ketonic and esteric oxygenated functional groups. Alternatively, the graphene may be chemically modified with amine or imine functionality. In one embodiment, the chemical modification of graphene may occur before, during and/or after the method as presently described herein.

In one embodiment, the graphene produced by the method described herein in any of its embodiments may be chemically modified such that it has a C:O ratio of less than 10, preferably less than 5, preferably less than 4, preferably less than 3, preferably less than 2. In another embodiment, the graphene produced by the method described herein in any of its embodiments may be chemically modified such that it has a C:N ratio of less than 50, preferably less than 40, preferably less than 30, preferably less than 20, preferably less than 10. It is equally envisaged that the method described herein in any of its embodiments may be adapted to produce chemically modified graphene such as graphene fluoride.

The examples below are intended to further illustrate methods protocols for preparing and characterizing the graphene intercalation compounds and graphene nanosheets of the present disclosure. Further, they are intended to illustrate assessing the properties of these nanomaterials. They are not intended to limit the scope of the claims.

Example 1

Preparation of Graphene Nanosheets

The linear dicarboxylic acids with chemical formula HOOC—$(CH_2)_n$—COOH are organic compounds that have two carboxyl functional groups (—COOH). The functional groups enable the dicarboxylic acid to interact with the carbon network of the graphite planes from both sides with distance depending on the chain length of the employed dicarboxylic acid. FIG. 1 shows a table illustrating the chain lengths of dicarboxylic acids studied here. The current study is based upon the intercalation of starting material graphite flakes for the production of graphene. The graphene is produced via intercalating starting material graphite flakes with dicarboxylic acids having various molecular lengths. The intercalating dicarboxylic acids having various chain lengths are able to diffuse amongst the graphene layers and to expand and separate them from each other which enables the process of exfoliation to proceed more smoothly. The crystal structure of graphite contains multilayers of graphene planes with the distance between two successive planes being 0.335 nm, and the lattice constant $c_0=0.67$ nm as shown in FIG. 2. Since the dicarboxylic acids used herein have chain lengths of between 0.38 nm and 1.42 nm, this makes the process of intercalation among graphene layers of a graphite material easier than several conventionally used acids.

The process of the graphene production was started by the intercalation of graphite flakes with various dicarboxylic acids as follows. Briefly, 5.0 g of graphite flakes were dispersed into 400 mL of a 2.0M solution of the desired dicarboxylic acid. The suspension was left for 24 hours under ambient conditions. After this time, the suspension was filtered and washed several times until the excess of dicarboxylic acid had been removed and then the filtrate was left to dry naturally in open air. Subsequently, 0.5 g of these graphite flakes treated with dicarboxylic acid were inserted into a ceramic crucible and put into a conventional microwave oven at 850 W for 60 seconds. From this heating, the graphite flakes intercalated with dicarboxylic acid were noticeably expanded. The graphite flakes intercalated with dicarboxylic acids causes an expansion of the graphite flakes under microwave power of 850 W in only one minute. The length of these expanded graphite flakes was variable depending on the chain length of the dicarboxylic acid used.

The expanded intercalated graphite flakes were quickly dispersed into 50 mL of hexanol, transferred into a Teflon autoclave and sealed. Hexanol was selected because it has a surface energy matching that of graphene, a high diffusion coefficient, low interfacial tension and excellent surface wetting characteristics. These properties enable the hexanol to efficiently exfoliate graphite directly to recover graphene. The Teflon autoclave was put into the microwave oven at a power of 850 W for 30 minutes. The expanded intercolated graphite flakes are exfoliated/reduced in one step under microwave irradiation of 850 W in the presence of hexanol in a sealed Teflon autoclave within 30 minutes. Subsequently, the Teflon autoclave was quenched quickly into an ice bath to cool the material. The supernatant was then collected by centrifugation at 10000 rpm for 15 minutes and the precipitate was washed with acidic water and then dried at 50° C. overnight.

Example 2

Analysis of Prepared Graphene Nanosheets

Figure 3:
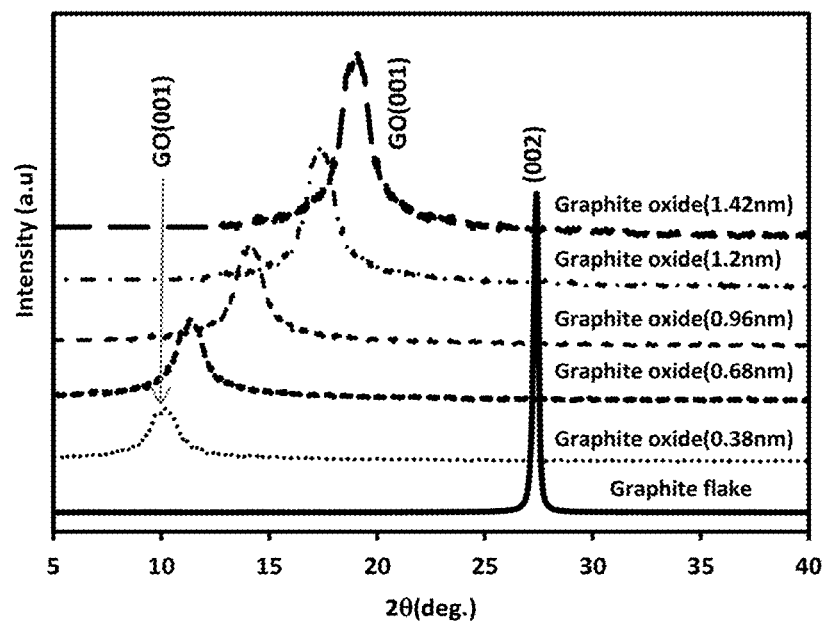
FIG. 3 is the X-ray diffraction (XRD) spectra of graphite material (graphite flakes) before and after treatment with dicarboxylic acids having various chain lengths.

In order to elucidate the influence of the chain length of the chosen dicarboxylic acids, X-ray diffraction (XRD) measurements were performed for the graphite flakes before and after intercalation with the five selected dicarboxylic acids having various chain lengths. The results are presented in FIG. 3. It is noticeable that a clear shift of the characteristic graphite peak (peak 002) from 2θ=26.5° to 2θ<20° (i.e. 10.7°) (peaks labelled GO(001)) took place after the treatment and heating of the graphite flakes with dicarboxylic acids of various chain lengths. The shift of the peak position is heavily dependent on the chain length of the dicarboxylic acids. In general, shorter chain lengths cause a larger shift while the longer chain lengths cause a smaller shift. The interplanar distance ($d_{002}$) was calculated and found to be 0.82 nm, 0.74 nm, 0.59 nm, 0.48 nm and 0.44 nm for dicarboxylic acids with chain lengths of 0.38 nm, 0.68 nm, 0.96 nm, 1.20 nm and 1.42 nm respectively. Such an increase in the interplanar space among graphene layers of the graphite flakes will enhance the diffusion of the hexanol among these layers during exfoliation under microwave power.

Figure 4:
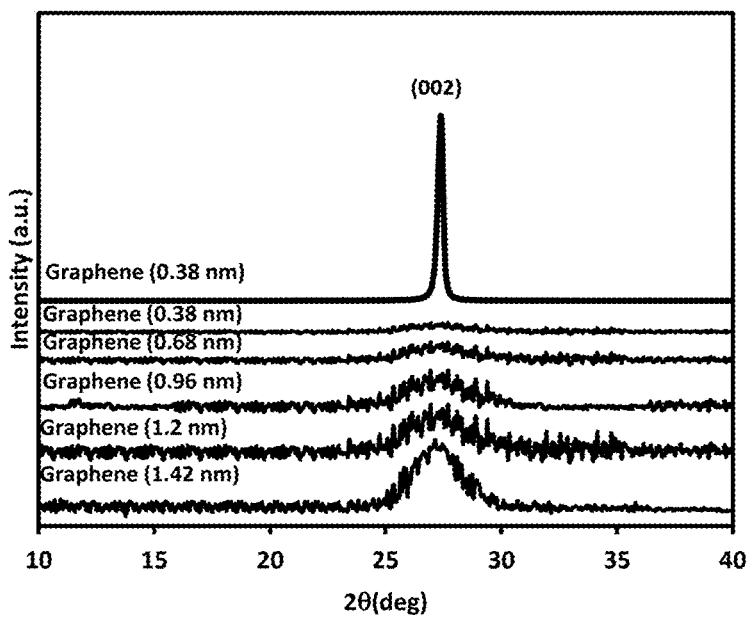
FIG. 4 is the XRD spectra of graphene nanosheets prepared using dicarboxylic acids having various chain lengths.

In addition, X-ray diffraction (XRD) measurements were taken after exfoliation/reduction under microwave power in the presence of hexanol and the results are presented in FIG. 4. It is noticeable that the (002) peak of exfoliated intercalated graphite with dicarboxylic acids having various chain lengths is located at the same angle as the pristine graphite flakes which indicates that the produced graphene retains the original pristine structure of graphite. This means the intercalation of graphite with dicarboxylic acids having short chain lengths (i.e. in the range of 0.38 nm) which matches the interplanar distance graphene layers results in the production of monolayer graphene and that as the chain length of the dicarboxylic acid increases the number of produced graphene layers increases. The number of graphene layers was estimated from formula (I).

$$N = \frac{R}{d_{(002)}} + 1 \qquad (I)$$

wherein, $$R = \frac{0.89\lambda}{\beta_{(002)}\cos\theta} A = \pi r^2$$

Using this relationship, the number of graphene layers was found to be 1, 2, 4, 7, and 12 layers for graphite treated with dicarboxylic acids having a chain length of 0.38 nm, 0.67 nm, 0.94 nm, 1.2 nm, and 1.42 nm respectively.

Figure 5:
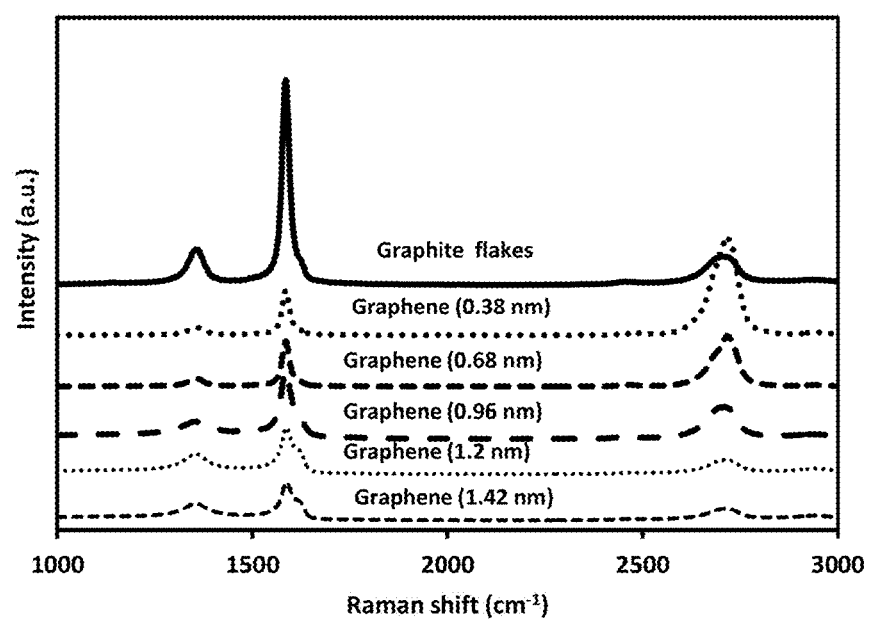
FIG. 5 is the Raman spectra for the starting graphite material (graphite flakes) and the obtained graphene nanosheets prepared using dicarboxylic acids having various chain lengths.

The Raman spectra for graphene were also monitored to confirm the high yield exfoliation of graphene and the data is shown in FIG. 5. For the starting material graphite flakes, the typical D, G and 2D bands appear clearly at 1321 $cm^{-1}$, 1584 $cm^{-1}$, and 2706 $cm^{-1}$ respectively. The appearance of the D band with small intensity indicates that the starting graphite flakes already have low defects. The exfoliated graphene sheets after intercalation with dicarboxylic acids having various chain lengths under microwave radiation, the D band largely disappeared or had very low intensity indicating the exfoliated graphene sheets have less defects. Furthermore, the G and 2D bands were observed at 1580-1585 cm-1 and 2700-2705 $cm^{-1}$ respectively. The intensity of the G band decreased and the intensity of the 2D band increased as the chain lengths of the intercalating dicarboxylic acids decreased in relation to the corresponding band intensities of the starting material graphite flakes.

The number of layers were determined using the ratio of $I_{(2D)}/I_{(G)}$. It was found that the ratio of $I_{(2D)}/I_{(G)}>2$, in the case of oxalic acid, or where the intercalating dicarboxylic acid had a chain length of 0.38 nm. These results indicate the high yield exfoliation of starting material graphite flakes to monolayer graphene nanosheets under microwave irradiation in the presence of alcohol. For the intercalating dicarboxylic acid having a chain length of 0.67 nm (succinic acid) it was found that the ratio of $I_{(2D)}/I_{(G)}=1$, which indicates bilayer graphene was formed. For the other intercalating dicarboxylic acids having various chain lengths it was found that the ratio of $I_{(2D)}/I_{(G)}<1$, indicating the formation of multilayer graphene sheets. Thus, according to the present disclosure, the intercalation of starting material graphene flakes with different dicarboxylic acids having varying chain lengths allows control of the number of produced graphene layers. The shortest molecular length dicarboxylic acid (oxalic acid, 0.38 nm) results in the production of monolayer graphene, the longest examined molecular length dicarboxylic acid (sebacic acid, 1.42 nm) results in the production of multilayer graphene. Thus, the present invention provides a facile, low cost, rapid and efficient method to obtain high quality graphene on a large scale wherein the number of layers obtained can be controlled, including monolayer graphene.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for producing graphene nanosheets with a predetermined number of layers of graphene, the predetermined number selected from the group consisting of 1, 2, 3-5, 6-8, and 9-15, the method comprising:
   (a) selecting a dicarboxylic acid having a molecular chain length of 0.3-0.5 nm for producing graphene nanosheets with 1 layer of graphene, a molecular chain length of 0.55-0.75 nm for producing graphene nanosheets with 2 layers of graphene, a molecular chain length of 0.95-1.0 nm for producing graphene nanosheets with 3-5 layers of graphene, a molecular chain length of 1.15-1.25 nm for producing graphene nanosheets with 6-8 layers of graphene, and a molecular chain length of 1.3-2.0 nm for producing graphene nanosheets with 9-15 layers of graphene;
   (b) treating graphite material with a liquid intercalating agent solution comprising the dicarboxylic acid for a first period of time to form a graphite intercalation compound;
   (c) heating the graphite intercalation compound by microwave irradiation at a first power for a second period of time to form an expanded graphite intercalation compound;
   (d) dispersing the expanded graphite intercalation compound into an alcohol which does not comprise methanol to form a colloidal suspension of the expanded graphite intercalation compound; and
   (e) heating the colloidal suspension of the expanded graphite intercalation compound by microwave irradiation at a second power for a third period of time to exfoliate and/or reduce the expanded graphite intercalation compound and form the graphene nanosheets with the predetermined number of layers of graphene.

2. The method of claim 1, wherein the graphene nanosheets with 1 layer of graphene have an average thickness of less than 0.4 nm, the graphene nanosheets with 2 layers of graphene have an average thickness of 0.4-0.8 nm, the graphene nanosheets with 3-5 layers of graphene have an average thickness of 1-1.65 nm, the graphene nanosheets with 6-8 layers of graphene have an average thickness of 2-2.7 nm, and the graphene nanosheets with 9-15 layers of graphene have an average thickness of 3-5 nm.

3. The method of claim 1, wherein the graphene nanosheets with the predetermined number of layers of graphene are pristine graphene with an oxidized graphene content of less than 5% by weight relative to the total weight of the graphene nanosheets.

4. The method of claim 1, wherein the graphene nanosheets with the predetermined number of layers of graphene are pristine graphene with a carbon content of greater than 95% by weight relative to the total weight of the graphene nanosheets.

5. The method of claim 1, wherein the graphene nanosheets with the predetermined number of 1 or 2 layers of graphene are at least 80% of the total graphene nanosheets produced.

6. The method of claim 1, wherein the dicarboxylic acid is at least one selected from the group consisting of a linear unsubstituted dicarboxylic acid, a linear substituted dicarboxylic acid, an aromatic dicarboxylic acid, an alkylitaconate dicarboxylic acid, and a branched-chain dicarboxylic acid.

7. The method of claim 1, wherein the dicarboxylic acid is a linear dicarboxylic acid and has the general formula HOOC—$(CH_2)_n$—COOH, wherein n is a whole number in the range of 0-2 or 4-8.

8. The method of claim 1, wherein the dicarboxylic acid having a molecular chain length of 0.3-0.5 nm for producing graphene nanosheets with 1 layer of graphene is oxalic acid, the dicarboxylic acid having a molecular chain length of 0.55-0.75 nm for producing graphene nanosheets with 2 layers of graphene is succinic acid, the dicarboxylic acid having a molecular chain length of 0.95-1.0 nm for producing graphene nanosheets with 3-5 layers of graphene is adipic acid, the dicarboxylic acid having a molecular chain length of 1.15-1.25 nm for producing graphene nanosheets with 6-8 layers of graphene is suberic acid, and the dicarboxylic acid having a molecular chain length of 1.3-2.0 nm for producing graphene nanosheets with 9-15 layers of graphene is sebacic acid.

9. The method of claim 1, wherein the first period of time is 8-30 hours in (b).

10. The method of claim 1, wherein the graphite intercalation compound is heated at a temperature above 175° C. in (c).

11. The method of claim 1, wherein the second period of time is 5-300 seconds in (c).

12. The method of claim 1, wherein the first power of the microwave irradiation in (c) is 200-1000 W.

13. The method of claim 1, wherein the alcohol in (d) comprises hexanol.

14. The method of claim 1, wherein the third period of time in (e) is 10-100 minutes.

15. The method of claim 1, wherein the colloidal suspension of the expanded graphite intercalation compound is heated at a temperature above 175° C. in (e).

16. The method of claim 1, wherein the second power of the microwave irradiation in (e) is 200-1000 W.

* * * * *